United States Patent [19]
Kling

[11] 4,383,559
[45] May 17, 1983

[54] APPARATUS FOR TRANSFERRING COILS OR BUNDLES OF ROD OR WIRE

[76] Inventor: Georg Kling, Bennauer Strasse 4, 5300 Bonn, Fed. Rep. of Germany

[21] Appl. No.: 180,830

[22] Filed: Aug. 25, 1980

[30] Foreign Application Priority Data

Aug. 25, 1979 [DE] Fed. Rep. of Germany ....... 2934439

[51] Int. Cl.³ ............................................. B21F 3/04
[52] U.S. Cl. ............................................... 140/92.2
[58] Field of Search ............. 140/1, 2, 92.2, 102; 242/79, 81; 294/93, 97; 198/408, 480, 651

[56] References Cited

U.S. PATENT DOCUMENTS

| | | | |
|---|---|---|---|
| 2,198,644 | 4/1940 | Wettengel | 242/81 |
| 2,879,101 | 3/1959 | Daroci | 294/97 |
| 3,104,126 | 9/1963 | Lovash | 242/79 |
| 3,572,604 | 3/1971 | Reth et al. | 140/2 X |
| 3,598,251 | 8/1971 | Sieurin | 242/79 X |
| 3,648,736 | 3/1972 | Hill et al. | 140/1 |
| 3,737,050 | 6/1973 | Leeuwestein | 198/651 X |
| 4,147,310 | 4/1979 | Harden et al. | 242/81 X |

FOREIGN PATENT DOCUMENTS 987489 3/1965 United Kingdom .

Primary Examiner—Gil Weidenfeld
Assistant Examiner—Fred A. Silverberg
Attorney, Agent, or Firm—Louis E. Marn; Elliot M. Olstein; Louis E. Marn

[57] ABSTRACT

Apparatus for transferring coils or bundles of rod or wire. The apparatus has a turn-table whose axis is inclined to the vertical, and mandrels on the turn-table each make an angle to the axis of the turn-table which is equal to the angle between the axis of the turn-table and the vertical. As the turn-table rotates, each mandrel moves between an uppermost position in which it is substantially vertical and a lowermost position in which it is inclined to the vertical. A conveyor track has an inclined portion which is adjacent to and parallel to the mandrel in the lowermost position. On the track, there can be a carrier which either removes coils or bundles from, or supplies coils or bundles to, the respective mandrel.

14 Claims, 6 Drawing Figures

APPARATUS FOR TRANSFERRING COILS OR BUNDLES OF ROD OR WIRE

BACKGROUND OF THE INVENTION

The present invention relates to apparatus for transferring coils or bundles of rod or wire. The apparatus can thus be used for taking up or collecting rod or wire into coil or bundle form, and the rod or wire can be in overlapping turns in what is known as a "fan-shaped configuration"; alternatively, the apparatus can be used for unwinding coils or bundles of rod or wire. The apparatus comprises a rotary turntable, a plurality of circumferentially-spaced mandrels carried on the turntable, conveying means comprising a track having an inclined portion which is adjacent to the turntable, and means for transferring the coils or bundles between the turntable and the conveying means—for instance, the track can be used for conveying away compact coils or bundles as a finished product.

There are various apparatuses of the type described in the foregoing paragraph, for instance comprising rotary coiler plates or a direct feed arrangement in which the coils or bundles are tipped over. Such apparatuses have a number of parts which are subject to wear, and in general may be relatively expensive and subject to faults, and may require a relatively large difference in level between the level at which the coils or bundles are removed and the feed level, e.g. the level of a rod mill which is producing the rod.

SUMMARY OF THE INVENTION

There is disclosed an apparatus for transferring coils or bundles of rod or wire and comprised of a turntable having an axis inclined to the vertical axis and mandrels positioned thereon and disposed at an angle to the axis of the turntable equal to the angle between the axis of the turntable and the vertical axis. As the turntable rotates, each mandrel moves between an uppermost position in which it is substantially vertical and a lowermost position in in which it is inclined to the vertical. A conveyor track has an inclined portion which is adjacent to and parallel to the mandrel in the lowermost position. On the track, there can be a carrier which either removes coils or bundles from, or supplies coils or bundles to, the respective mandrel.

The apparatus of the invention can be used to collect rod or wire in fan-shaped configuration into a compact coil or bundle and can convey the coil or bundle from the collecting station to the track, and on the track, the coil or bundle can be brought up to a horizontal portion which is directly at the level of for instance the rod mill, from which the rod or bundle can be transferred to for instance a hook of a conveyor.

In practice, the turntable may have a conical upper surface which, as seen in axial section, is substantially at right angles to the axes of the mandrels, and the mandrels themselves can be four in number, circumferentially spaced at 90°.

It is advantageous to associate a lifting mechanism with the uppermost position of the mandrels, for raising the respective mandrel (the take-up mandrel) into a formation chamber for forming the coil or bundle.

It is preferred that the distances between the mandrels are such that when the mandrels are loaded with coils or bundles, contact between the coils or bundles is not possible.

In a preferred embodiment, the mandrels can be individually expanded radially outwards when they are in said uppermost position and can be individually contracted radially inwards when they are in said lowermost position (radially being relative to the axis of the respective mandrel). In order to do this, the mandrels can have individual drives.

If, as is preferred, a carrier is movable along the track for conveying the coil or bundle, the carrier may have a lifting device for lifting the coil or bundle off the mandrel as the carrier moves up the inclined portion, or for placing the coil or bundle on the mandrel as the carrier moves down the inclined portion. If the mandrel can be contracted radially inwards in said lowermost position, the coil or bundle can be lifted off or placed on very nearly without friction.

If the carrier is present, the carrier may have a holding device which is movable longitudinally of the carrier, for holding loose end turns of the coil or bundle, normally the front loose end turns if the coil or bundle has just been formed and is being conveyed away from the forming station. In this way, the loose end turns are stabilised or kept in a substantially constant position in relation to the carrier as the carrier moves.

If the carrier is present, the carrier may have an abutment for holding the coil or bundle or keeping it in a substantially constant position in relation to the carrier, again stabilising the coil or bundle.

The conveying means may further comprise a hook conveyor having at least one carrying hook positioned to transfer the coil or bundle between the track and the hook conveyor, for instance for engaging the coil or bundle directly as it is carried by the carrier.

DESCRIPTION OF AN EMBODIMENT OF THE INVENTION

One embodiment of the invention is described with reference to the accompanying drawings, in which.

Figure 1:
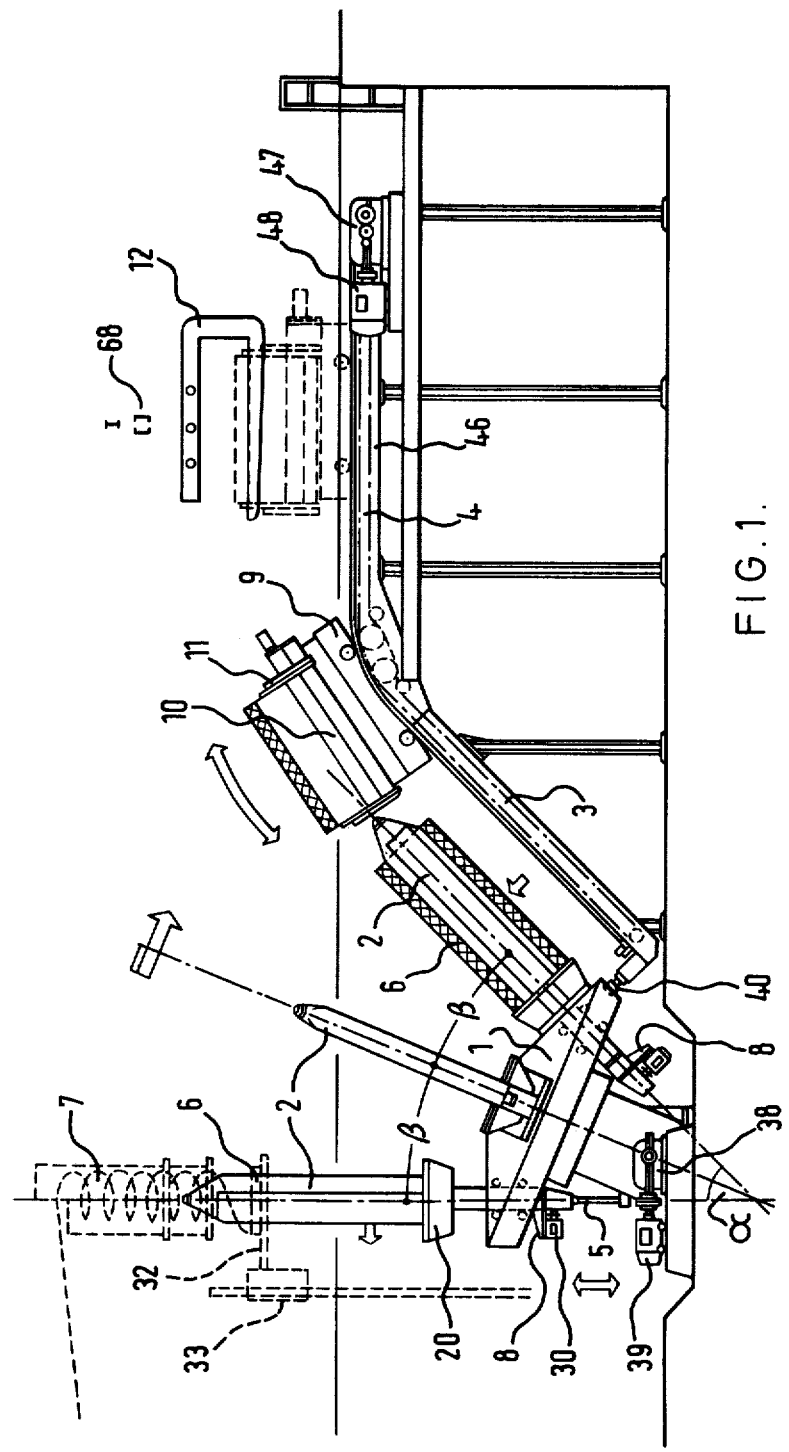
FIG. 1 is a side view, partly in vertical section through the turntable, of apparatus in accordance with the invention.

The apparatus will be described briefly with respect to FIG. 1 and then in more detail with respect to the remaining Figures. Known components or components whose construction and function can be deduced from the drawings may not be described.

The apparatus shown is specifically for collecting rod or wire in fan-shaped configuration and removing it as coils or bundles, but it has wider application. As shown in FIG. 1, the apparatus comprises an axially rotatable rod or wire coil displacement turntable 1 which has a conical upper surface on whose periphery are fitted preferably four equi-spaced outer mandrels 2. The turntable 1 has an inclined axis which is at an acute angle $\beta(=\alpha/2)$ to the axes of the mandrels 2 and which is at the same angle $\beta$ to the vertical, wherein $\alpha$ may be about 45°. The axis of the turntable 1 lies between the vertical mandrel 2 in the uppermost position (the take-up mandrel) and an inclined portion 3 of a discharge track 4. A respective discharge mandrel 2 is the mandrel 2 disposed in the lowermost position parallel to the inclined portion 3 of the discharge track 4. A lifting mechanism 5 is associated with the take-up mandrel 2, in order to lift the take-up mandrel 2 into a formation chamber 7 which is directly above the take-up mandrel 2, for winding a coil or bundle 6.

The distances between the mandrels 2 on the turntable 1 are so chosen that there is no contact between the coils or bundles 6 when the mandrels 2 are loaded.

When the mandrels 2 are in the vertical take-up position and in the inclined, discharge position, they can be respectively expanded radially outwards and contracted radially inwards by means of individual drives 8 associated with the mandrels 2. Expansion takes place when in the vertical take-up position in order to centre the coil or bundle 6 and to prevent it from turning when rotating the turntable 1. The mandrel 2 is contracted when it is in the inclined discharge position, to enable the coil or bundle 6 to be discharged without excessive friction and wear.

A longitudinally movable conveying carrier or truck 9, fitted with a lifting device 10, is disposed on the inclined portion 3 of the discharge track 4. By operating the lifting device 10, the coil or bundle 6 can be lifted without excessive friction from its position on the mandrel 2 after this latter has been contracted inwards.

For conveying the coil or bundle 6, the loose front turns are held and made safe for conveying by means of a holding device 11 which is disposed in the truck 9 and is movable longitudinally with respect to the truck 9, in order to prevent the coil or bundle or its turns fanning out downwards from the truck 9, particularly during horizontal conveying.

As the truck 9 travels into its lowermost position, it holds the coil or bundle 6 or keeps the coil or bundle 6 in a relatively constant position on the truck 9, by means of an abutment disposed on the truck 9.

The truck 9 transfers the finished coil or bundle 6 to a carrying hook 12 of for instance a circulating conveyor (known as a "power-and-free conveyor") or an overhead conveyor, which can be provided directly at the level of the rolling mill.

Figure 2:
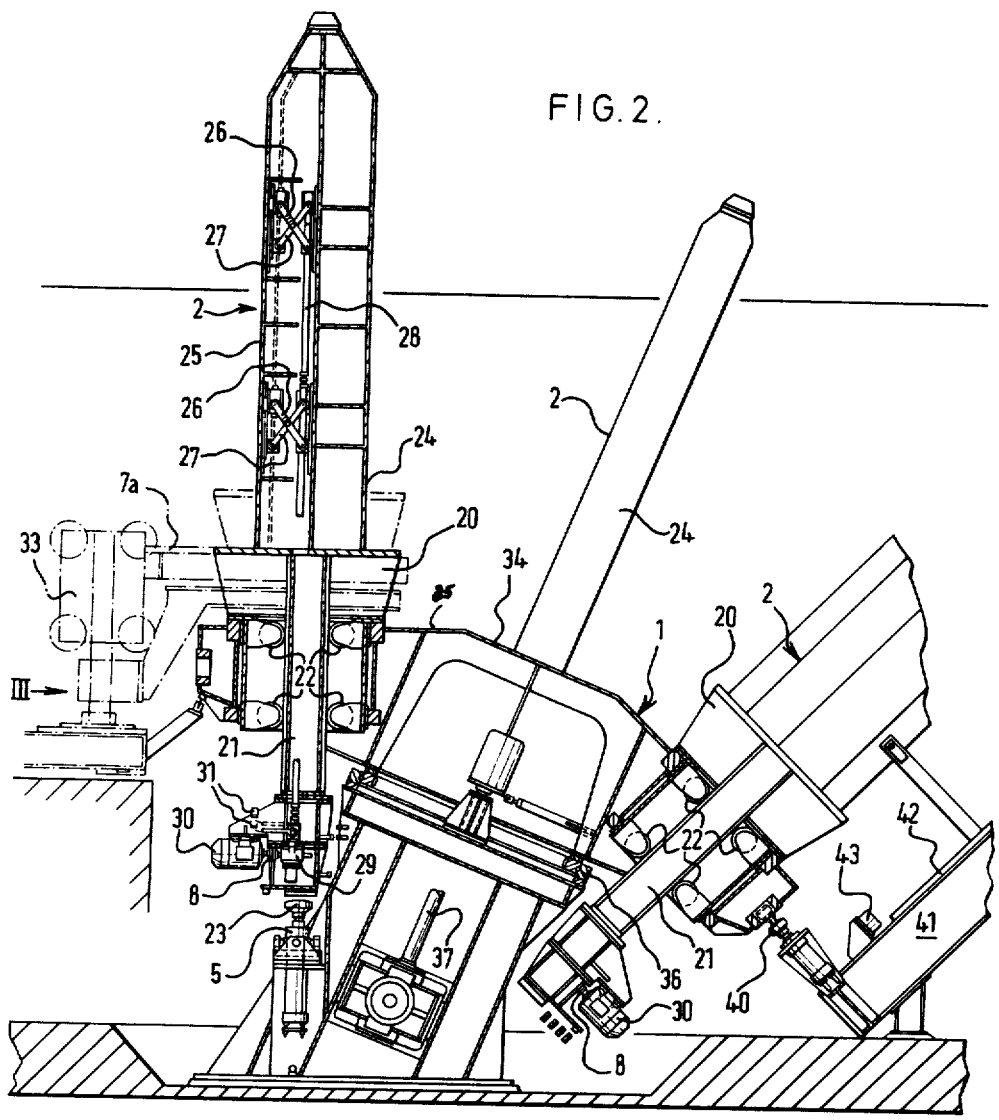
FIG. 2 is a view of the turntable, mainly in vertical section, on a larger scale.

As shown in FIG. 2, each mandrel has a collar 20 for supporting the lower end of the coil or bundle 6 during transfer.

Figure 3:
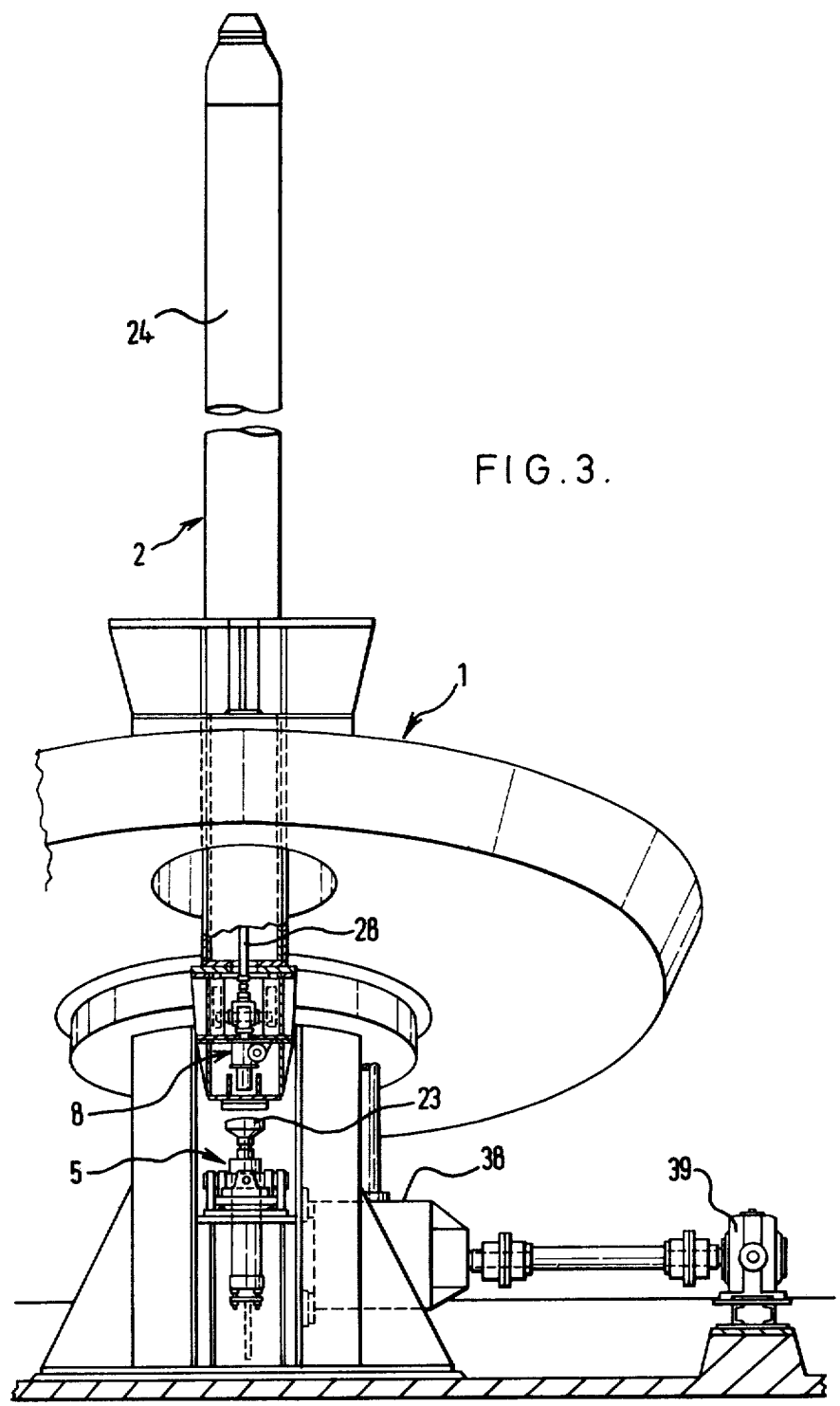
FIG. 3 is a view of part of the turntable, looking in the direction of the arrow III in FIG. 2.

The construction of the turntable 1 and of the mandrels 2 can be seen more clearly in FIGS. 2 and 3. Each mandrel is carried on a bar 21 which is guided for axial movement by rollers 22. Directly beneath the lower end of the bar 21 of the take-up mandrel 2 is a hydraulically actuated ram 23 for lifting the take-up mandrel into the chamber 7 (the take-up mandrel 2 is shown in the raised position in FIG. 1 but in a lowered position in FIG. 2).

Figure 4:
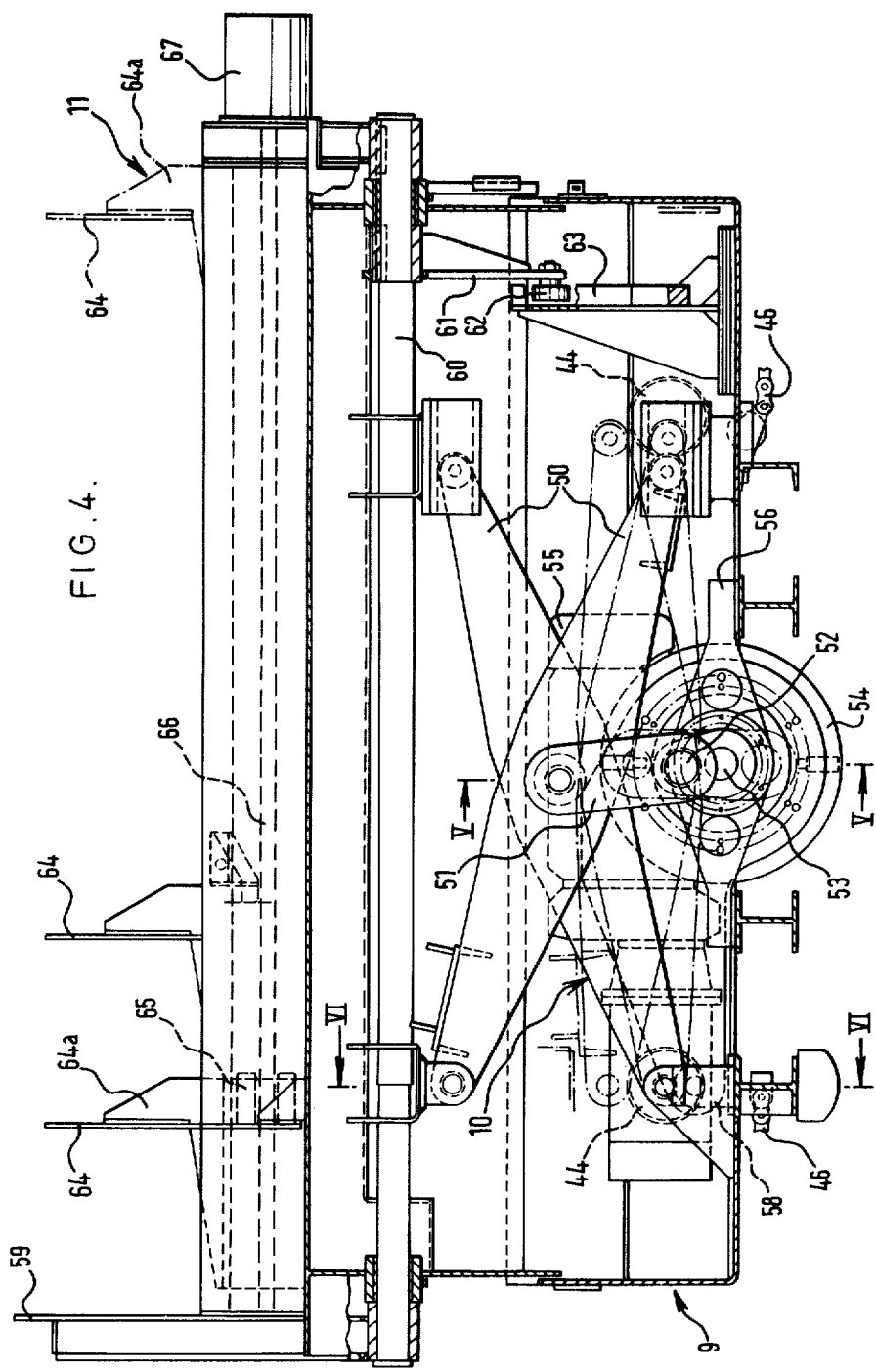
FIG. 4 is a view of the truck, partly in vertical section along the line IV—IV in FIG. 5, on a larger scale than that in FIGS. 2 and 3.

In order to enable the mandrels 2 to expand and contract, the outer surface of each mandrel 2 is formed in at least two segments. In the specific arrangement shown in the drawings, the mandrel 2 has its outer surface formed in just two segments, and FIG. 4 shows the end view of the contracted mandrel 2 in full lines, the expanded position being shown in dot-dash lines. As can be seen in FIG. 2, there is a main segment 24 which is fixed in relation to the bar 21 and a movable segment 25 which is connected to the main segment 24 by "lazytong" parallel-motion links 26, 27, the arrangement being such that the movable segment 25 moves strictly at right angles to the axis of the mandrel 2. The inner ends of the links 27 are connected to an actuating rod 28 which is connected in turn to a spindle-and-nut mechanism 29 driven by a motor 30, there being associated limit switches 31. The movable segment 25 of the take-up mandrel 2 is shown in FIG. 1 in full lines in its expanded position, its contracted position being indicated with dashed lines.

The base of the formation chamber 7 is initially closed by a collecting plate 32, which descends as the coil or bundle 6 builds up, the respective mechanism 33 being indicated in FIG. 2. The plate 32 is in two parts which are pivoted together and which close around the take-up mandrel 2 like pincers and which can be opened to allow the mandrel 2 to move out of the take-up position and the new mandrel 2 to move into the take-up position.

The turntable 1 is of box construction, and, as shown in FIG. 2, has a central surface 34 at right angles to its axis, surrounded by a conical surface 35 at right angles to the axis of each mandrel 2 (as seen in vertical section). The turntable 1 is carried on axial/thrust bearings 36. The turntable 1 can be rotated by an axial shaft 37 through a gear-box 38 and a motor 39 controlled by an electrical simulator (not shown). There is a hydraulically-actuated arrestor 40 for locking the turntable 1 in the correct position.

Figure 5:
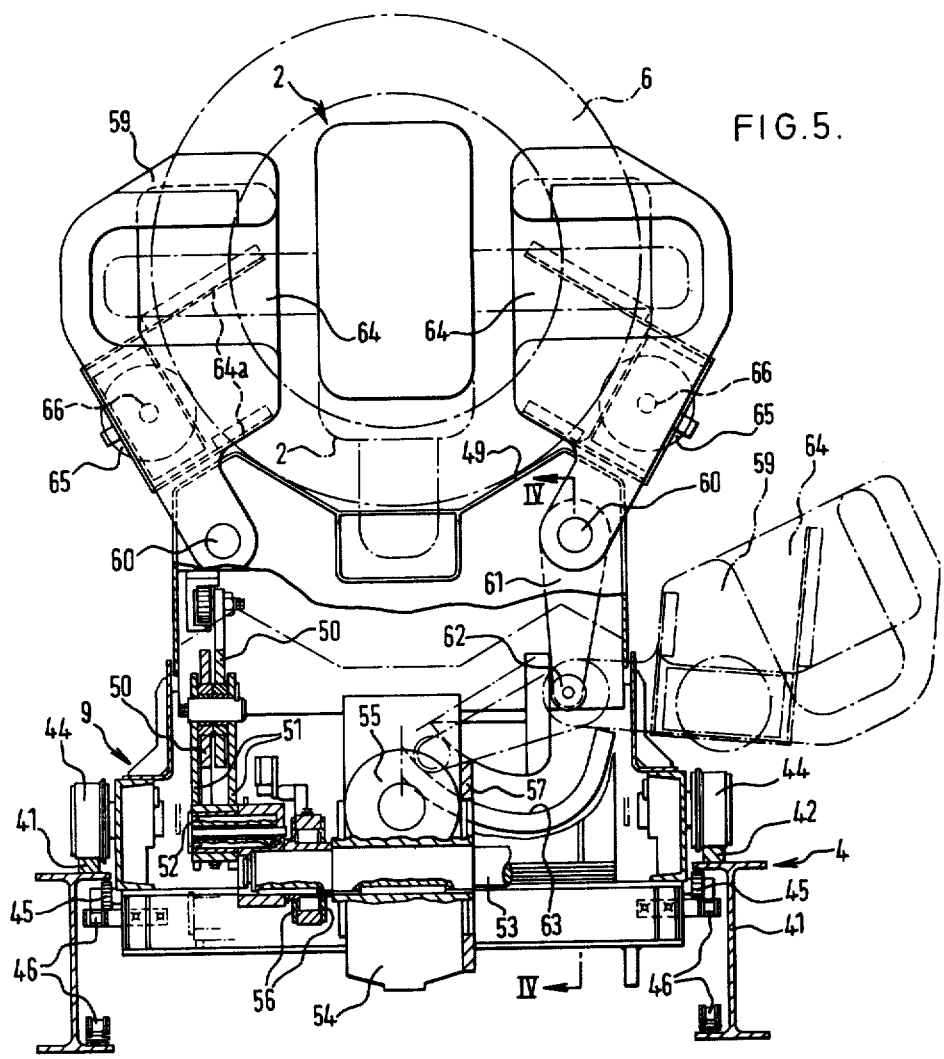
FIG. 5 is a view of the truck, partly in vertical section along the line V—V in FIG. 4.

As shown in FIG. 5, the discharge track 4 is in the form of a framework 41 carrying rails 42. An end buffer 43 is indicated in FIG. 2. The truck 9 has main wheels 44 and under wheels 45 for running along the track 4 and is moved by two parallel "endless" chains 46 driven in turn by a sprocket (not shown), gear-box 47 and motor 48 (see FIG. 1).

Figure 6:
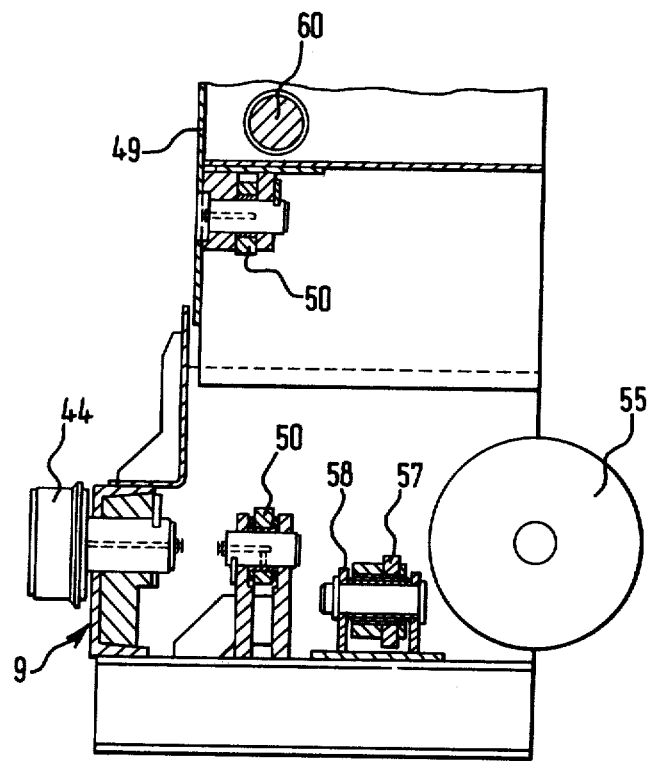
FIG. 6 is a vertical section along the line VI—VI in FIG. 4.

The truck 9 has an upper part in the form of a cradle 49 for receiving the coil or bundle 6. This cradle 49 is connected to the lower chassis of the truck 9 by means of the lifting device 10, which is in the form of a "lazytong" parallel motion mechanism having two pairs of links 50, as shown in FIG. 4. The links 50 are raised and lowered by means of respective connecting links 51 on each side of the truck 9 connected to a crank 52 carried on a crankshaft 53 driven through gearing 54 by a motor 55. The crankshaft 53 carries the gearing 54 and motor 55, and is journalled in two pairs of yokes 56 supported on the chassis of the truck 9. In addition, there are two torque arms 57 which are pivoted to respective brackets 58 and are fixed to the casing of the motor 55 (see FIGS. 4 and 6). In FIG. 5, the raised position of the lifting device 10 is shown in full lines and the lowered position in dot-dash lines.

In order to hold the coil or bundle 6 and keep it in a substantially constant position relative to the truck 9, the truck 9 has two abutment plates 59 which engage the lower or rear end of the coil or bundle 6. So that the turntable 1 can be moved into the discharge position when the truck 9 is already positioned to receive the coil or bundle 6, or alternatively so that the truck 9 can be moved into a position to receive the coil or bundle 6 when the turntable 1 is already in the discharge position, the abutment plates 59 are fixed to respective axial shafts 60, and is pivoted out sideways as shown by the dash-dot lines to the right of FIG. 5, when the cradle 49 descends. To achieve this, each shaft carries an actuating arm 61 which in turn carrying a cam follower 62 which engages a camway 63.

In order to compress the coil or bundle 6 axially, and hold and make safe the loose front turns, the holding device 11 is in the form of two plates 64 which engage the upper or front end of the coil or bundle 6, and which are carried on brackets 64a rotationally fixed to the respective shafts 60. The plates 64 are movable longitudinally with respect to the cradle 49, and in order to accomplish this, the brackets 64a connected by respective spindle-and-nut mechanisms 65 to threaded longitudinal shafts 66 driven by respective motors 67. FIG. 4 indicates the position of the plates 64 in full lines, for the smallest coil or bundle 6, and also indicates an intermediate position and the opposite end position of the plates 64. It will be seen that the plates 64 can have their positions adjusted for various lengths of coil or bundle 6, in addition to being movable in order to compress the coil or bundle 6.

The arrangement shown in FIG. 1 is such that the carrying hook is of a known type which moves along a track 68 at right angles to the plane of the drawing. The hook 12 is therefore in position before the truck 9 moves to the right, and the truck 9 must then move to the left before the hook 12 can convey the coil or bundle 6 away.

The apparatus can be provided with normal control gear, including a programmer and limit switches, to ensure that it carries out its operations in the correct sequence.

I claim:

1. Apparatus for transferring coils or bundles of rod or wire, comprising:
   a turntable rotatable about an axis inclined to a vertical axis;
   a plurality of circumferentially-spaced mandrels carried on said turntable and having axes disposed at an angle to said axis of said turntable, wherein the angle is substantially equal to an angle between said axis of said turntable and said vertical axis, whereby as said turntable rotates, each of said mandrels moves between a substantially vertical uppermost position and a substantially lowermost position inclined at an angle both to the vertical axis and to a horizontal axis;
   conveying means comprised of a track having an inclined portion adjacent to and substantially parallel to said axes of said mandrels in said lowermost position; and
   means for transferring said coils or bundles between said mandrels in said lowermost position and said conveying means.

2. The apparatus as defined in claim 1, wherein there are provided four of said mandrels, circumferentially spaced with 90° between adjacent said mandrels, and wherein said turntable has a conical upper surface substantially at right angles to said axes of said mandrels.

3. The apparatus as defined in claim 1, wherein a lifting mechanism is associated with said uppermost position of said mandrels for raising a respective mandrel into a formation chamber for forming said coils or bundles.

4. The apparatus as defined in claim 3, wherein each of said mandrels comprises a surface portion having a first maximum dimension at right angles to said axes of said mandrels, and is supported by extended support and guide means extending parallel to said axes of said mandrels and having a second maximum dimension at right angles to said axes of said mandrels substantially less than said first maximum dimension, the apparatus further comprising guide members guiding said extended support and guide means in a direction parallel to said axes of said mandrels and drive means for acting on said extended support and guide means for raising said mandrels.

5. The apparatus as defined in claim 4, wherein said drive means is fixed to act only on said mandrels in said substantially uppermost position, said drive means thereby acting in turn on said extended support and guide means of each of said mandrels.

6. The apparatus as defined in claim 1, wherein the distances between the mandrels are such that when the mandrels are loaded with the coils or bundles, contact between the coils or bundles is not possible.

7. The apparatus as defined in claim 1, wherein said mandrels are individually expanded radially outwards in said uppermost position and individually contracted radially inwards in said lowermost position.

8. The apparatus as defined in claim 7, wherein said mandrels have individual drives for expansion and contraction.

9. The apparatus as defined in claim 7, wherein each of said mandrels comprises a movable surface segment extending for substantially the whole length thereof and parallel motion means constraining said movable surface segment to movement substantially radial of said axes of said mandrels.

10. The apparatus as defined in claim 1, wherein a carrier is movable along said track for conveying said coils or bundles, said carrier supporting said transferring means, said transferring means comprised of a lifting device for lifting said coils or bundles off said mandrels as said carrier moves up the inclined portion or for placing the coils or bundles on said mandrels as said carrier moves down the inclined portion.

11. The apparatus as defined in claim 1, wherein a carrier is movable along the track for conveying the coils or bundles, said carrier having an abutment for engaging a first end of said coils or bundles nearer said turntable, and a holding device movable longitudinally of said carrier for engaging a second end of said coils or bundles remote from said first end thereby holding loose end turns of the coils or bundles.

12. The apparatus as defined in claim 1, wherein a carrier is movable along the track for conveying the coils or bundles, the carrier having an abutment for holding the coils or bundles or keeping it in a substantially constant position in relation to the carrier.

13. The apparatus as defined in claim 1, wherein a carrier is movable along the track for conveying the coils or bundles, the carrier having an abutment for engaging a first end of said coils or bundles nearer said turntable, and a holding device movable longitudinally of said carrier for engaging a second end of said coils or bundles remote from said first end thereby holding loose end turns of said coils or bundles, said abutment being fixed in relation to said carrier thereby keeping said coils or bundles in a substantially fixed position in relation to said carrier.

14. The apparatus as defined in claim 1, wherein a carrier is movable along the track for conveying the coils or bundles, the conveying means further comprising a hook conveyor having at least one carrying hook positioned to transfer the coils or bundles between the carrier and the hook conveyor, said carrier being movable along said track to a position in which said hook is fully inserted into said coils or bundles.

* * * * *